United States Patent [19]

Welch

[11] 4,318,525
[45] Mar. 9, 1982

[54] SUPPORTING DEVICE

[76] Inventor: Jan Welch, P.O. Box 992, Winter Park, Fla. 32790

[21] Appl. No.: 99,465

[22] Filed: Dec. 3, 1979

[51] Int. Cl.³ .......................................... F16M 13/00
[52] U.S. Cl. ..................................... 248/228; 248/340
[58] Field of Search .................... 248/72, 217.3, 226.5, 248/228, 340; 211/34; 24/20 S, 22

[56] References Cited

U.S. PATENT DOCUMENTS

| | | | |
|---|---|---|---|
| 499,549 | 6/1893 | Hunter et al. | 248/72 |
| 813,033 | 2/1906 | Bellamy | 24/20 LS |
| 2,944,781 | 7/1960 | Masters | 248/228 |
| 2,954,200 | 9/1960 | Gannon et al. | 248/228 |
| 3,102,614 | 9/1963 | Lydard | 403/400 X |
| 3,327,376 | 6/1967 | Freeman et al. | 248/228 X |
| 3,730,466 | 5/1973 | Swanquist | 248/217.3 X |
| 4,065,090 | 12/1977 | Mauney | 248/228 |
| 4,112,550 | 9/1978 | DeWitt et al. | 248/228 X |
| 4,118,000 | 10/1973 | Campbell | 248/228 |

FOREIGN PATENT DOCUMENTS

| | | | |
|---|---|---|---|
| 811968 | 1/1937 | France | 24/20 S |
| 698696 | 10/1953 | United Kingdom | 248/60 |
| 708534 | 10/1978 | United Kingdom | 248/72 |

*Primary Examiner*—William H. Schultz

*Attorney, Agent, or Firm*—Mason, Kolehmainen, Rathburn & Wyss

[57] ABSTRACT

The present invention relates to an improved device for supporting an object from a flanged ceiling supporting member of the type conventionally used in drop tile ceilings. More specifically, the device is adapted to cooperate with a ceiling panel supporting member having oppositely extending flanges which are provided with upper ceiling panel supporting surfaces. Briefly, the supporting device is of one-piece resilient construction and comprises a loop portion for receiving and holding an object supporting element, such as a suspension cord, and also comprises crossed legs formed integral with the loop portion of the device. The crossed legs have ends which are adapted to be spread apart by compressing the loop portion of the device against the inherent resiliency of the device, whereby the edges of the supporting member flanges may be received within the leg ends. The leg ends terminate in tips which extend toward each other and are adapted to move toward each other under the influence of the inherent resiliency of the device to overlie the supporting surfaces of the supporting member flanges when the compression force on the loop portion of the device is removed.

2 Claims, 8 Drawing Figures

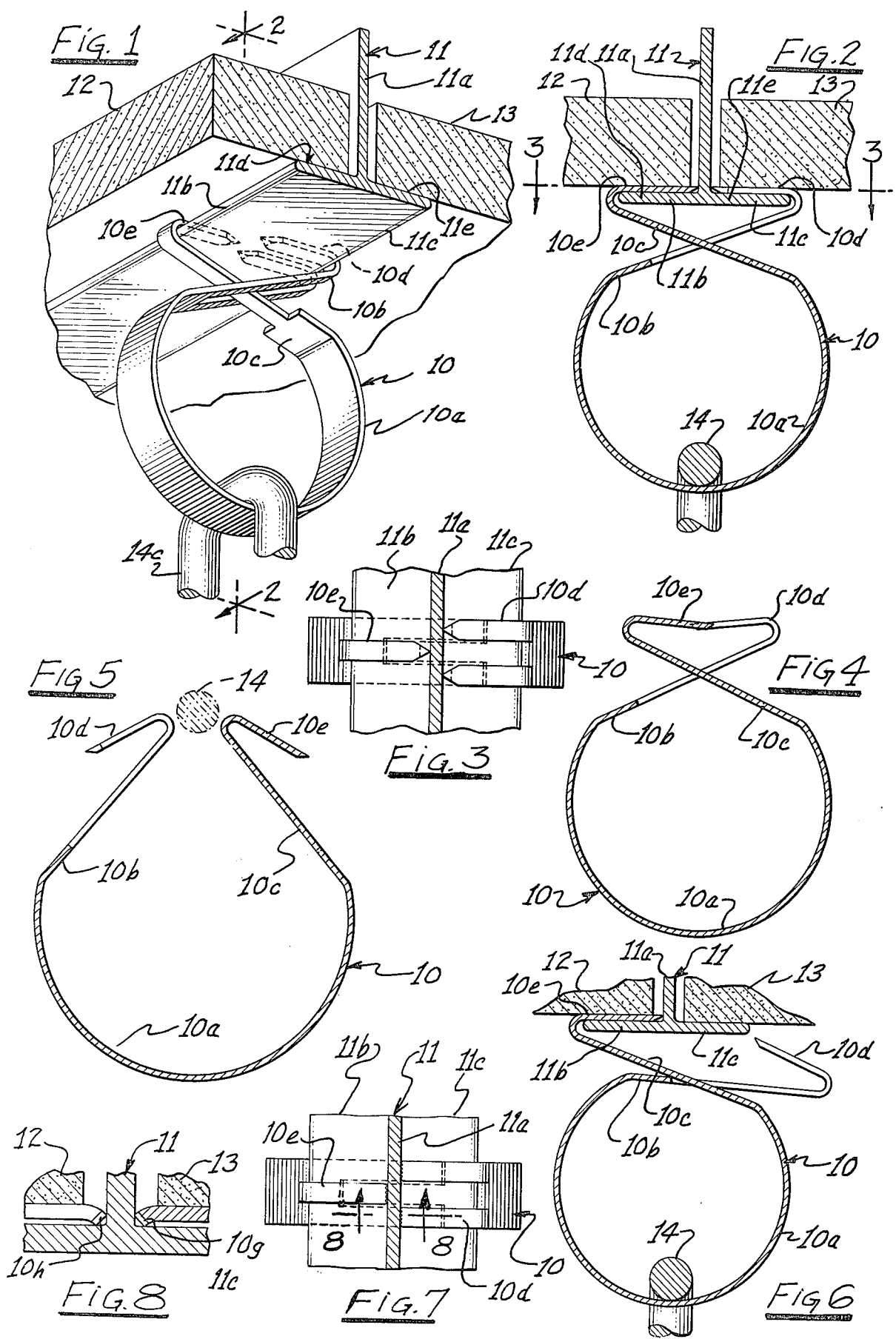

SUPPORTING DEVICE

The present invention relates to supporting devices and more particularly to an improved device for supporting an object such as a flower pot or the like from a flanged ceiling panel supporting member of the type conventionally used in drop tile ceilings.

Broadly, supporting devices of the indicated type are disclosed in the prior art. For example, Campbell U.S. Pat. No. 4,118,000 discloses apparatus for supporting an object from a drop tile ceiling wherein the flanges of an inverted T-bar ceiling panel supporting member are utilized as anchor surfaces for a ceiling supporting hook from which an object, such as a potted plant, or the like, may be suspended. However, this and other prior art structures are of somewhat complicated construction and hence are costly to produce and somewhat difficult to install.

It is an object of the present invention to provide an improved one-piece supporting device for the above indicated purpose which is of extremely simple and low cost construction.

It is another object of the invention to provide an improved supporting device of the character described which may be easily and quickly installed by any unskilled person without the use of any tools whatsoever.

The invention, both as to its organization and mode of installation and use, will best be understood by reference to the following specification, taken in connection with the accompanying drawing, in which:

FIG. 1 is a perspective view illustrating the present improved ceiling supporting device in its installed position;

FIG. 2 is a sectional view taken along the lines 2—2 of FIG. 1;

FIG. 3 is a sectional view taken along the lines 3—3 of FIG. 2;

FIG. 4 is a view, partially in section, illustrating the device in its unstressed or non-biased position;

FIG. 5 is a view, partially in section, illustrating the device with its legs in the biased open position to receive a supporting element, such as a cord, within the loop portion thereof;

FIG. 6 is a view illustrating the device in partially installed position on a ceiling panel supporting member;

FIG. 7 illustrates a modified leg end structure of he device; and

FIG. 8 is a sectional view taken along the lines 8—8 of FIG. 7.

Referring now to the drawing and more particularly to FIG. 1 thereof, the present improved ceiling supporting device 10 is there shown used in combination with an inverted T-shaped ceiling panel supporting member 11 to hold an object, such as a flower pot, in a suspended position from the drop-panel ceiling of which the member 11 forms a part. More specifically, the ceiling panel supporting member 11 embodies a central vertically disposed web 11a and oppositely extending lower flanges 11b and 11c, the upper surfaces 11d and 11e of which serve partially to support two ceiling panels 12 and 13. As will be understood, in a finished drop-ceiling the bottom flanges 11b and 11c are exposed to view in the room in which the ceiling components 11, 12 and 13 are located. It will also be understood that the object to be suspended from the finished ceiling by means of the supporting device 10 and an object supporting element, such as a flexible cord 14 or the equivalent.

In more detail, the supporting device 10 is of resilient one-piece construction, being made of light spring steel or spring bronze, for example, and comprises a loop portion 10a and two crossed legs 10b and 10c which terminate in tips 10d and 10e, respectively. As best shown in FIGS. 1, 2 and 3, the tips 10d and 10e face toward each other and in the ceiling mounted position of the device are adapted to overlie the supporting surfaces 11d and 11e of the supporting member flanges 11b and 11c. In order to permit the crossing of the legs 10b and 10c, the leg 10b and its associated tip 10c are provided with a continuous elongated slot 10f which extends throughout the combined lengths thereof. This slot is centrally disposed along the lengths of the leg 10b and the tip 10e and is adapted to receive therewithin the leg 10c and tip 10d. As will be apparent, the leg 10c and tip 10e are freely movable within the slot 10f.

In using the present improved supporting device to support an object from the ceiling supporting member 11, the legs 10b and 10c are manually forced apart to occupy the relative positions illustrated in FIG. 5 of the drawing. With the legs thus physically separated at their free ends, the looped end of the object supporting element 14 may readily be passed therebetween and then released to position itself on the bottom of the loop portion 10a of the device. Manual force on the legs 10b and 10c may now be released, permitting the legs 10a and 10b and the tips 10d and 10e to self-restore to the at-rest positions shown in FIG. 4 of the drawings.

In order to bring the device 10 into object supporting relationship with the ceiling panel supporting member 11, the device is manually stressed by pressing on opposite sides of the loop portion 10a of the device thereby to compress this portion of the device until the tips 10d and 10e of the device are separated to occupy the approximate positions illustrated in FIG. 6 of the drawing. As will be understood from the preceding explanation, this operation involves increased crossing of the legs 10b and 10c, which means that the length of the slot 10f must be of sufficient length to accommodate this very substantial crossing of the legs.

While manually holding the device 10 with its legs and tips occupying the positions shown in FIG. 6 of the drawing, the tip 10e, for example, may be readily pushed beneath the ceiling panel 12 to overlie the upper supporting surface 11d of the supporting member flange 11b. Following this operation, the tip 10d may be pushed upward against the ceiling panel 13 and released, permitting the leg 10b to self-restore and move in a leg uncrossing movement toward the leg 10b thus bringing the tip 10d into overlying relationship with the supporting surface 11e of the supporting member flange 11c. As will be understood, the ceiling panels 12 and 13 are conventionally very light in weight and are not fixedly secured to the supporting members 11. Hence, very little effort is required to lift these panels sufficiently to accommodate the tips 11d and 11e therebelow. Thus, the above described device mounting operations may be easily performed without marring the exposed lower surfaces of the ceiling panels.

Once the device mounting operations are completed in the above described manner, the components of the device 10 and the ceiling panel supporting member 11 occupy the relative positions illustrated in FIGS. 1 and 2 of the drawing. In these relative positions, the spring metal of the device is under stress, as will be apparent from a comparison of FIGS. 2 and 4 of the drawing, so that the inherent resiliency of the device serves to bias the tips 10d and 10e toward each other and thus insure their retention in engagement with the upper supporting surfaces 11d and 11e of the supporting member flanges 11b and 11c. Moreover, the weight of the suspended object carried by the lower end of the supporting element 14 causes a clamping force to be exerted on the legs 10b and 10c so that the inner junction surfaces between the ends of these legs and their associated tips 10d and 10e tend more tightly to embrace the outer edges of the supporting member flanges 11c and 11b. Thus with the components of the device 10 occupying the positions shown in FIG. 2 of the drawing, a continuing downward pull on the lower center of the loop 10a with the upper portions of the device 10 restrained results in the production of forces which tend to pull the tips 10d and 10e toward each other due to the fact that the legs 10b and 10c are crossed.

As will be understood from the foregoing explanation, in order to disengage the device 10 from the supporting member 11, all that is required is the exertion of manual force on the sides of the looped portion 10a of the device. As these sides are squeezed toward each other the tips 10d and 10e are spread apart and disengaged from the supporting member flanges 11b and 11c, thus permitting removal of the device 10 from its ceiling supporting position. Here again, the dismounting of the device 10 may readily be accomplished without marring the exposed lower surface of the ceiling panels 12 and 13.

If desired or necessary and as shown in FIGS. 7 and 8 of the drawing, the adjacent ends of the tips 10d and 10e may be provided with downwardly depending teeth for biting into the upper supporting surfaces 11e and 11d of the flanges 11c and 11b in order more positively to retain these tips in their assembled relationship with the supporting member flanges. As shown, these teeth comprise serrated edges 10g and 10h formed at the ends of the tips 10d and 10e which are bent slightly downward to form sharply pointed teeth for engaging the upper supporting surface 11d and 11e of the supporting member flanges 11b and 11c.

While the best mode of practicing the invention has been described, it will be understood that various modifications may be made therein which are within the true spirit and scope of the invention as defined in the appended claims.

I claim:

1. For use as a ceiling support in cooperation with a ceiling panel supporting member having oppositely extending flanges which are provided with upper ceiling panel supporting surfaces, a one-piece resilient supporting device adapted to support an object to be suspended from a ceiling, said device having a loop portion for receiving and holding an object supporting element and having cross legs formed integral with said loop portion and having ends which are adapted to be spread apart by manually compressing said loop portion against the inherent resilience of the device, whereby the edges of the supporting member flanges may be received within said leg ends, said legs being provided at their ends with tips which extend toward each other and are adapted to move toward each other under the influence of the inherent resiliency of the device to overlie the supporting surfaces of the supporting member flanges when the compression force on said loop portion is removed, one of said crossed legs being provided with a slot which extends inwardly from the end thereof and the other of said crossed legs being provided with a tongue portion at the end thereof which is movably disposed within said slot, whereby relative transverse movement of said leg ends is prevented.

2. A resilient ceiling supporting device as claimed in claim 1, wherein the extremities of said leg end tips are provided with downwardly depending teeth for contacting the engaged supporting surfaces of the supporting member flanges.

* * * * *